(12) United States Patent
Naik et al.

(10) Patent No.: US 10,577,016 B2
(45) Date of Patent: Mar. 3, 2020

(54) ASSIST COMPENSATION FOR ACTIVELY CONTROLLED POWER STEERING SYSTEMS

(71) Applicant: TRW Automotive U.S. LLC, Livonia, MI (US)

(72) Inventors: Anand Naik, Livonia, MI (US); Arnold Spieker, Livonia, MI (US); Tim Sworn, Livonia, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 15/328,630

(22) PCT Filed: Jul. 31, 2015

(86) PCT No.: PCT/US2015/043304
§ 371 (c)(1),
(2) Date: Jan. 24, 2017

(87) PCT Pub. No.: WO2016/019344
PCT Pub. Date: Feb. 4, 2016

(65) Prior Publication Data
US 2017/0203785 A1 Jul. 20, 2017

Related U.S. Application Data

(60) Provisional application No. 62/031,580, filed on Jul. 31, 2014, provisional application No. 62/031,569, filed on Jul. 31, 2014.

(51) Int. Cl.
*B62D 5/04* (2006.01)
*B62D 6/00* (2006.01)

(52) U.S. Cl.
CPC .......... *B62D 5/0484* (2013.01); *B62D 5/049* (2013.01); *B62D 5/0463* (2013.01); *B62D 5/0481* (2013.01); *B62D 6/00* (2013.01); *B62D 6/006* (2013.01)

(58) Field of Classification Search
CPC .................................................. B62D 5/0484
See application file for complete search history.

(56) References Cited

U.S. PATENT DOCUMENTS

| 7,066,295 B2 * | 6/2006 | Ohta ...................... B62D 5/008 |
| | | 180/422 |
| 7,234,564 B2 * | 6/2007 | Farrelly ................... B62D 6/04 |
| | | 180/412 |
| 7,500,538 B2 * | 3/2009 | Hara ....................... B62D 5/049 |
| | | 180/412 |

(Continued)

*Primary Examiner* — Alex C Dunn
(74) *Attorney, Agent, or Firm* — MacMillan, Sobanski & Todd, LLC

(57) ABSTRACT

An electric power steering system includes a control for providing a calculated torque assist demand in the event of failure of a steering wheel torque sensor. The control is responsive to one or more of a vehicle speed, a steering column position, a steering column velocity, a gear lever position, a vehicle yaw rate and a vehicle lateral acceleration for generating the calculated torque assist demand. The control is operable to modify the torque assist demand by providing one or more of (a) friction and inertial compensation, (b) vehicle oversteer compensation, (c) reverse motion compensation, (d) damping compensation and (e) self steer prevention.

10 Claims, 8 Drawing Sheets

(56) References Cited

U.S. PATENT DOCUMENTS

| | | | | |
|---|---|---|---|---|
| 7,565,946 B2* | 7/2009 | Suzumura | ............... | B62D 6/003 |
| | | | | 180/444 |
| 7,837,004 B2* | 11/2010 | Yasuda | ................ | B62D 5/0484 |
| | | | | 180/402 |
| 7,878,295 B2* | 2/2011 | Kato | ...................... | B62D 5/008 |
| | | | | 180/446 |
| 7,889,978 B2* | 2/2011 | Ueda | ..................... | B62D 5/046 |
| | | | | 318/400.01 |
| 8,209,079 B2* | 6/2012 | Nakane | ................ | B62D 5/0484 |
| | | | | 701/29.1 |
| 8,290,662 B2* | 10/2012 | Wang | ................... | G01M 17/06 |
| | | | | 701/36 |
| 8,596,408 B2* | 12/2013 | Uryu | .................... | B62D 5/0487 |
| | | | | 180/446 |
| 8,606,462 B2* | 12/2013 | Nakano | ................. | B62D 5/046 |
| | | | | 701/41 |
| 8,626,389 B2* | 1/2014 | Sidlosky | ................ | B60G 17/02 |
| | | | | 180/443 |
| 8,670,904 B2* | 3/2014 | Yoneda | ................. | B62D 5/046 |
| | | | | 180/404 |
| 8,897,939 B2* | 11/2014 | Ekuni | .................... | B63H 25/04 |
| | | | | 701/21 |
| 9,090,280 B2* | 7/2015 | Ono | ...................... | B62D 6/008 |
| 9,545,949 B2* | 1/2017 | Yamazaki | ............ | B62D 5/0466 |
| 9,821,838 B2* | 11/2017 | Hori | ..................... | B62D 5/0484 |
| 2004/0099469 A1* | 5/2004 | Koibuchi | ................ | B60T 8/175 |
| | | | | 180/421 |
| 2005/0171667 A1* | 8/2005 | Morita | .................. | B62D 5/049 |
| | | | | 701/43 |
| 2014/0005894 A1* | 1/2014 | Aoki | ................... | B62D 5/0484 |
| | | | | 701/43 |

* cited by examiner

ASSIST COMPENSATION FOR ACTIVELY CONTROLLED POWER STEERING SYSTEMS

CROSS-REFERENCE TO RELATED APPLICATIONS

This application claims the benefit of U.S. Provisional Application No. 62/031,569, filed Jul. 31, 2014 and U.S. Provisional Application No. 62/031,580, filed Jul. 31, 2014, the disclosures of both applications are incorporated herein by reference.

BACKGROUND OF THE INVENTION

This invention relates in general to vehicular steering systems. In particular, this invention relates to control of vehicular electric power steering systems.

EPS systems typically rely on a column torque sensor to measure the driver's steering command inputs and apply an assistance torque to the rack, via the motor, in order to support the driver in steering the vehicle. In the rare case where the column torque sensor fails, there would be a sudden loss of the assistance provided by the motor, thus returning the system to a manual steering mode. Previous angle-based, limp-home assist functions have addressed torque sensor failures in two ways: either using the difference between the upper column position calculated by an external steering position and lower column position calculated by using the motor position or by using vehicle speed and motor position data from a lookup table. In the first instance, the difference between the lower column and upper column position can be used to estimate driver torque input to the steering system. This estimated driver torque can then be used to demand assistance using conventional torque based control. However, this method requires the presence of at least an external upper column position sensor. In absence of such external sensor, upper column position can be estimated using motor position that is compensated or otherwise correlated to steering torque required inputs through a gear compliance model. Modeling the gear compliance would typically require significant effort and face robustness challenges for accurate estimation of the driver torque input. In the second case, a lookup table can be tuned to estimate required assistance based on motor position and vehicle speed signals. The accuracy of this approach, however, can be compromised significantly when road conditions deviate from those used to generate the tuning maps and look up tables. Additionally, this methodology also does not typically take into account system non-linearity responses, such as gear friction.

Several challenges present themselves when implementing an angle based method, as described above. First, additional upper column position sensors may not be available in all systems. This may be due to a lack of available packaging space or costs issues associated with maintaining carry-over designs. Second, relying on a single, angle sensor based approach can result in a self steer condition, particularly when the tuned assistance becomes greater than actual rack force. A self steer condition exists where the vehicle continues to steer in one direction without any input from the driver. Such a situation can occur as a result of overestimating the operating rack force, resulting in an over assist condition. This is particularly evident on slippery or low "µ ('mu')" surfaces. Typically, rack forces are higher on a high µ road surface than when driving on a low µ surface. Third, when only a single sensor is used, bumps or pot holes generate transient impact force inputs that create control compensation issue. The steering wheel will respond to rack forces imparted by the bump and the resulting angle causes an unintended assist. In a normally operating EPS system, such road disturbances would be canceled because an opposing torque would have been instantly built up due to the steering inertia. Fourth, a vehicle driving in reverse also presents an issue when using angle based control. In reverse, the pneumatic trail of the tire is in front of the center of the tire patch. In the instance where the mechanical trail is less than this pneumatic trail, the aligning moment will be in the opposing direction.

Another issue arises when there is a quick/sudden reversal of steering direction relative to the initial direction of assist. This condition would be most evident in a counter steer movement to correct an over-steer condition. In this scenario, the driver would be cornering with a positive steer angle (CW) and column torque and therefore a positive assist applied to the rack. When a counter steer is requested, the driver attempts to turn the wheel CCW. This results in the driver applying a negative torque to the steering wheel while the steering position is still positive. In a functional EPS system, the motor assist would be in a negative direction, aiding the driver to turn the steering wheel in a CCW direction. However, in an angle-based control environment, the assist would remain positive until the angle becomes negative. This condition, while generating a reduced counter torque, still opposes the desired steering motion, which affects driver reaction. Furthermore, on low µ surfaces, the potential exists for the system/driver to over correct in a counter steer condition, making the vehicle harder to control.

Thus, an improved assist compensation method would be desirable.

SUMMARY OF THE INVENTION

This invention relates to a method and apparatus to control the level of steering assist in an electric power steering system in a failed torque sensor limp-home mode based on a determination of the onset of front tire saturation.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
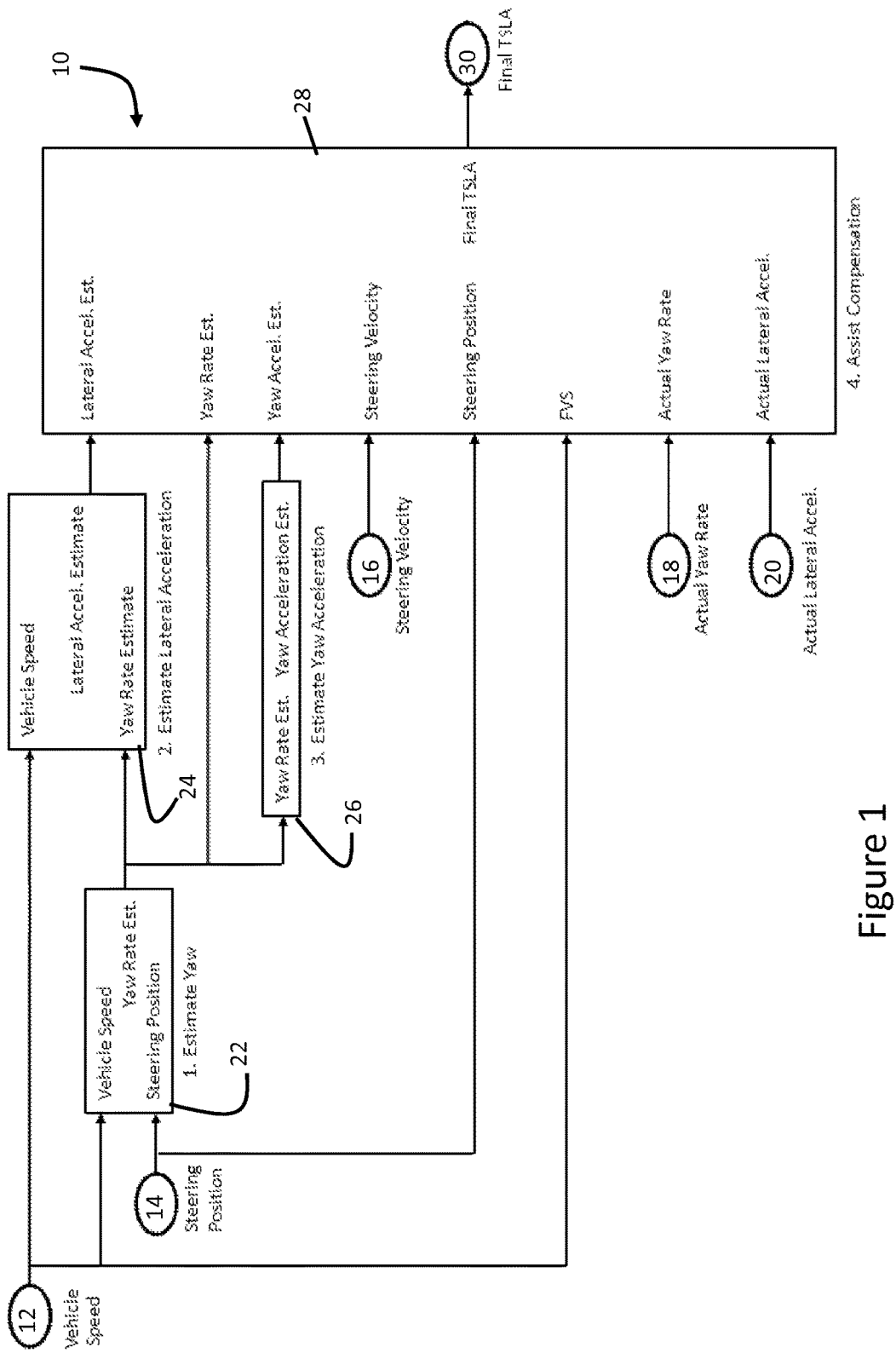
FIG. 1 is a schematic illustration of another embodiment of an EPS control system and algorithm having functional blocks.

Referring now to the drawings, there is illustrated in FIG. 1 a schematic illustration of an EPS control system, shown generally at 10, having an algorithm configured to provide steering assist compensation with a limp-home mode feature. In a broad aspect of the invention, the algorithm is configured to determine a level of steering assistance based on one or more of the following input signals from the related sensors: Vehicle Speed 12, Steering Position 14, Steering Velocity 16, Actual Yaw Rate 18, and Actual Lateral Acceleration 20.

As shown in FIG. 1, a first functional block 22, identified as "Estimate Yaw," calculates Yaw Rate based on Vehicle Speed (also termed "filtered vehicle speed, FVS") and Steering position. A second functional block 24, identified as "Estimate Lateral Acceleration" calculates a Lateral Acceleration based on Vehicle Speed and the Estimated Yaw Rate from functional block 22. A third functional block 26, identified as "Estimate Yaw Acceleration," uses the Yaw Rate Estimate from functional block 22 and calculates Yaw Rate Acceleration. A fourth functional block 28 identified as "Assist Compensation" Calculates the Final TSLA (Torque Sensor Limp Home Assistance) command 30 which contains two sub-functions as shown in FIG. 2.

Figure 2:
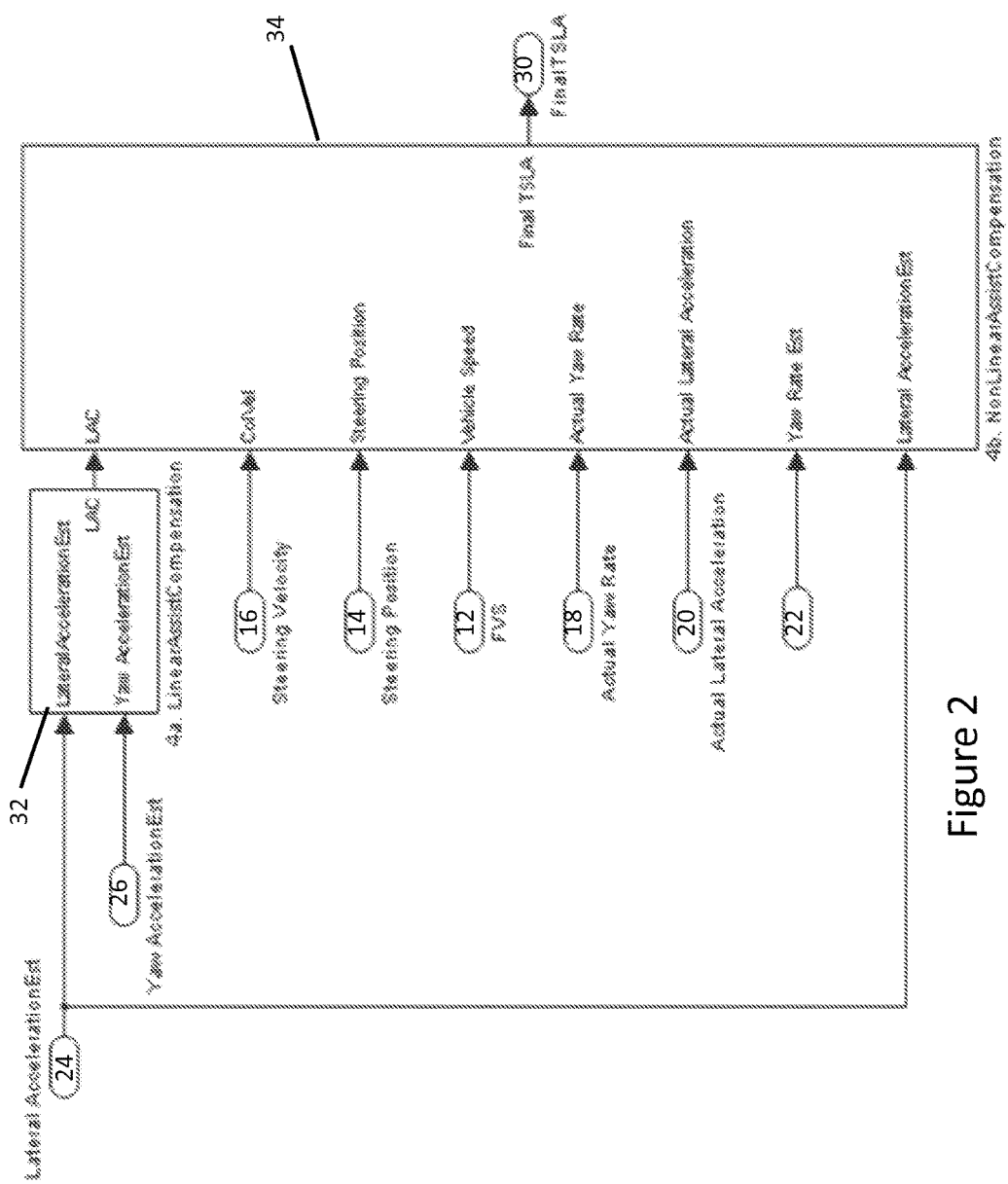
FIG. 2 is a schematic illustration showing details of a two-part functional block of FIG. 1.

Referring now to FIG. 2, the two sub-functions of functional block 28 determine a linear and non-linear assist compensation output based on different model considerations. In functional block 32, Linear Assistance Compensation sub-function block, Lateral and Yaw Acceleration Estimates are used to calculate Linear Assistance Compensation using a standard bicycle model. In functional block 34, the Non-Linear Assist Compensation sub-function block, five sub-functions are used to compensate for non-linearities that are often ignored or discounted in current systems.

Figure 3:
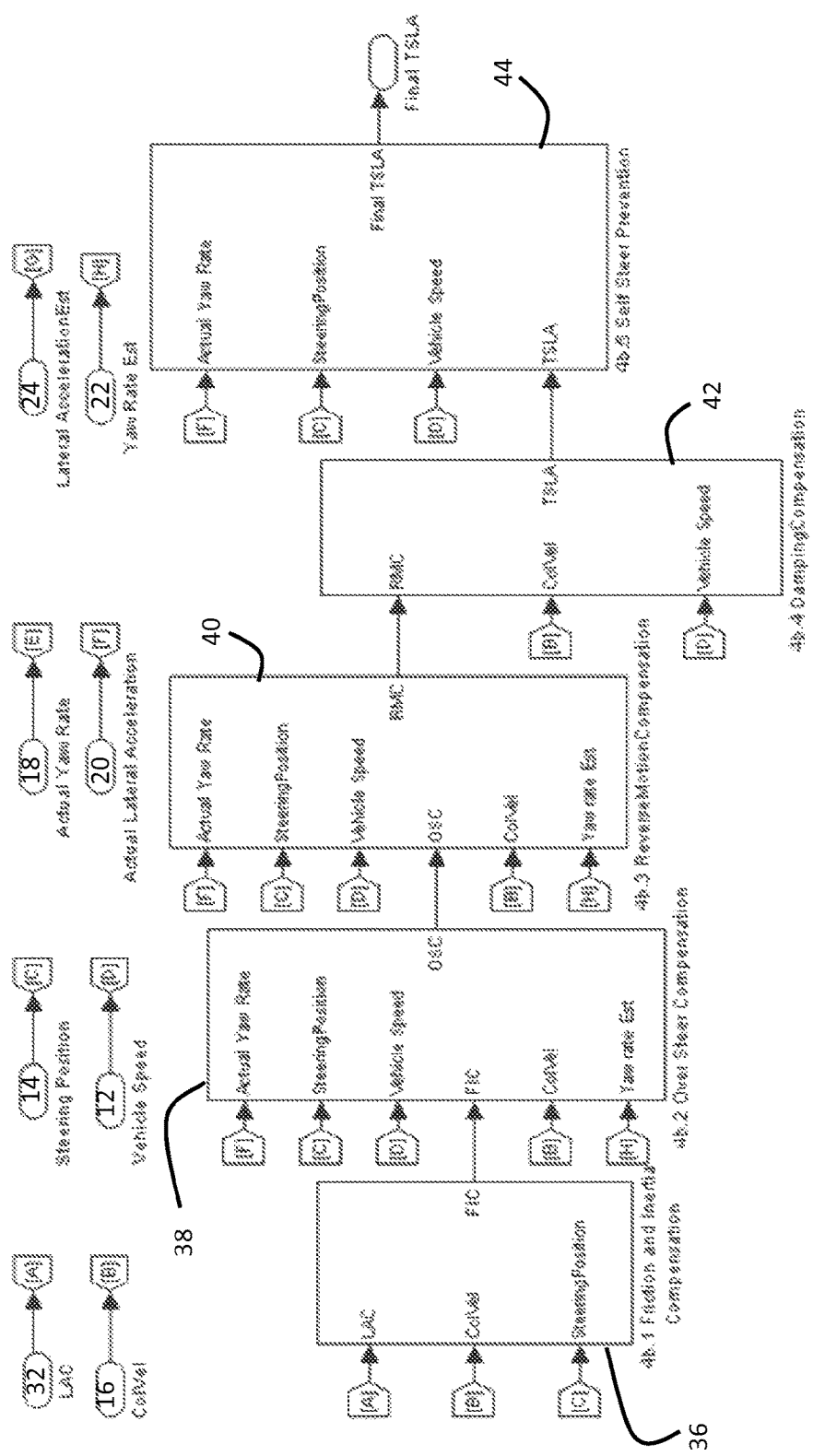
FIG. 3 is a schematic illustration showing details of one of the two-part functional blocks of FIG. 2.

Referring now to FIG. 3, there is illustrated a detailed flow diagram and schematic illustration of the Non-Linear Assist Compensation functional block 34 of FIG. 2. The Non-Linear Assist Compensation functional block 34 calculates the Final TSLA command using four sub functions. Sub-functional block 36 provides a Friction and Inertia Compensation (FIC). The linear assist compensation command (LAC) from functional block 32, discussed above, does not take gear friction into account. Additionally, there is an additional lag in the assist command induced by the causality of the system which is typically perceived as inertia feel. In a normal EPS, the boost curve and high frequency assist control (HFAC) function is typically tuned for such compensation. In the case of angle control, the estimated gear friction and any necessary lead for inertia compensation is added to the Linear Assistance Command 32 to compensate for gear friction based on Steering Velocity, Position and the operating Linear Assist Command.

Sub-functional block 38 provides an Over Steer Compensation (OSC). This sub-functional block provides a component of compensation during an over-steer event. An over-steer condition can be detected using a bicycle model to define the predicted Yaw Rate based on vehicle speed and steering angle or by calculating dBeta/dt (ay/u−yaw rate). Then, when an over-steer condition is detected, the FIC command from functional block 36 can be multiplied or added through an additional gain based on column velocity to generate the output command OSC. In one embodiment, this command may be a simple gain applied to column velocity. In another embodiment, this gain may vary as a function of measured parameters like vehicle velocity, steering position, and lateral acceleration. If an over correction is detected during a counter steer, the assistance demand may be ramped down to zero to prevent any undesirable steering effects. In one embodiment, over correction detection and control includes the detection of rear tire saturation, as will be described below.

Sub-functional block 40 provides a Reverse Motion Compensation (RMC). This sub-functional block mitigates potential issues that may arise when a vehicle is operated in reverse. In this sub-function, a vehicle in reverse motion is detected by comparing the Steering Angle and Yaw Rate. The vehicle is determined to be operated in a reverse motion when the Yaw Rate has an opposite sign to the Steering Angle. When this condition is detected, the assist is ramped down to zero. Alternatively, a gear selector input may also be used to detect a reverse operating condition.

Sub-functional block 42 provides a Damping Compensation. Going over abrupt road discontinuities, such as pot holes, can result in the steering gear being back driven from the rack end instead of the driver's intent. A back driven event, including high intensity back driven events, may be damped by commanding an opposite command to the generated steering velocity. This function calculates the RMC command as shown in functional block 40 to either reduce or limit assist based on steering velocity.

Sub-functional block 44 provides a Self Steer Prevention capability. Self steer typically occurs once the front tires reach saturation. The algorithm, and in particular sub-functional block 44, identifies this occurrence in real time and either holds EPS assist at its pre-occurrence level or ramps assist down by a certain percentage from that point onward until the tires re-enter their un-saturated region. The percentage reduction can be a tunable parameter based on the measured lateral acceleration of the vehicle. Additionally, assist demand can be further reduced for any additional steering motion in the direction of tire saturation based on the steering or motor velocity. By limiting any further assistance from the EPS self steer condition can be prevented. Self Steer event can be detected by comparing the estimated and actual Yaw Rate. The output of the 44 function is the Final TSLA command 30 that is sent to and controls the EPS motor if a faulty torque sensor is detected.

Figure 4:
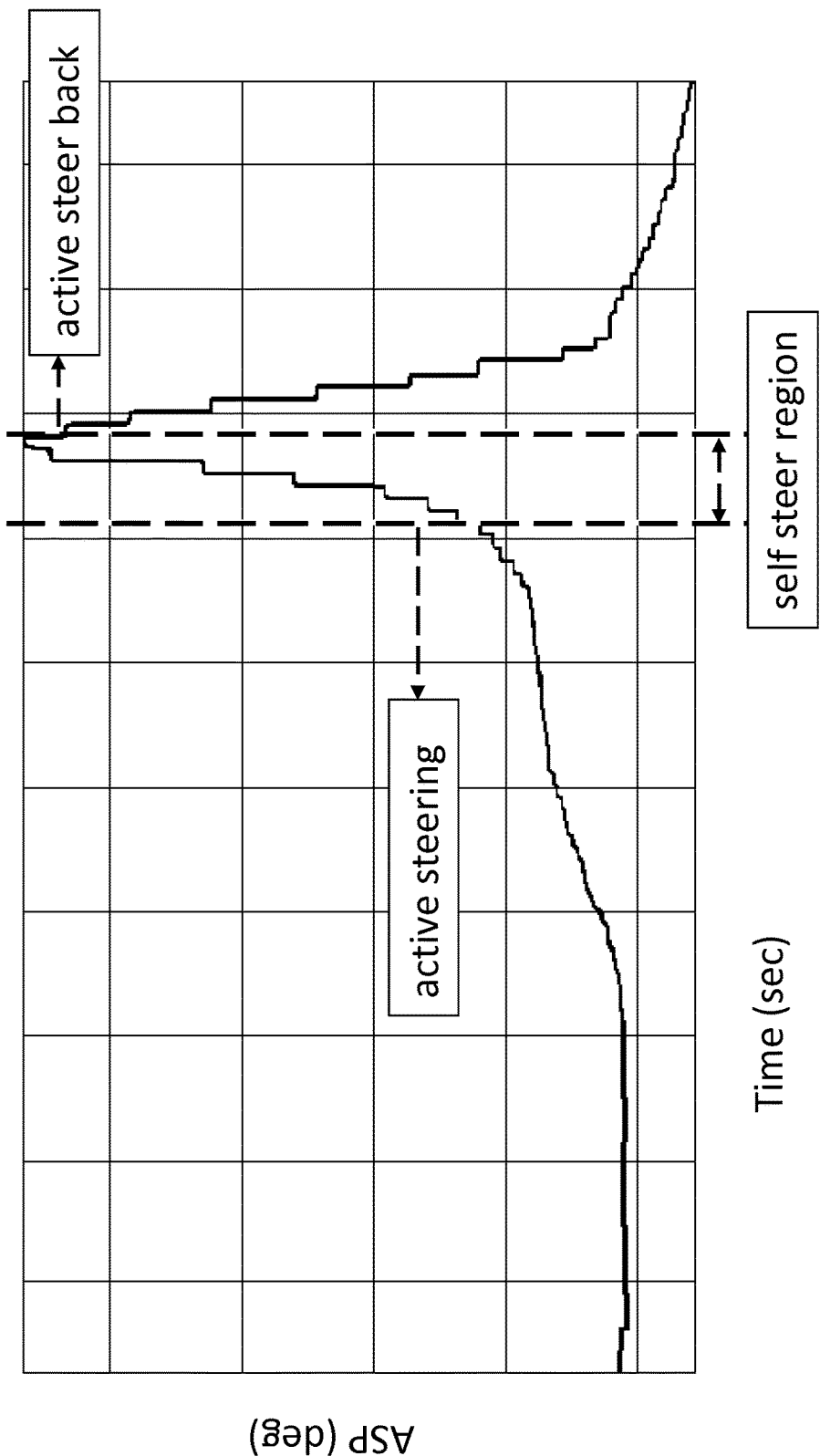
FIG. 4 is a plot of active steering position (ASP) vs. time.
Figure 5:
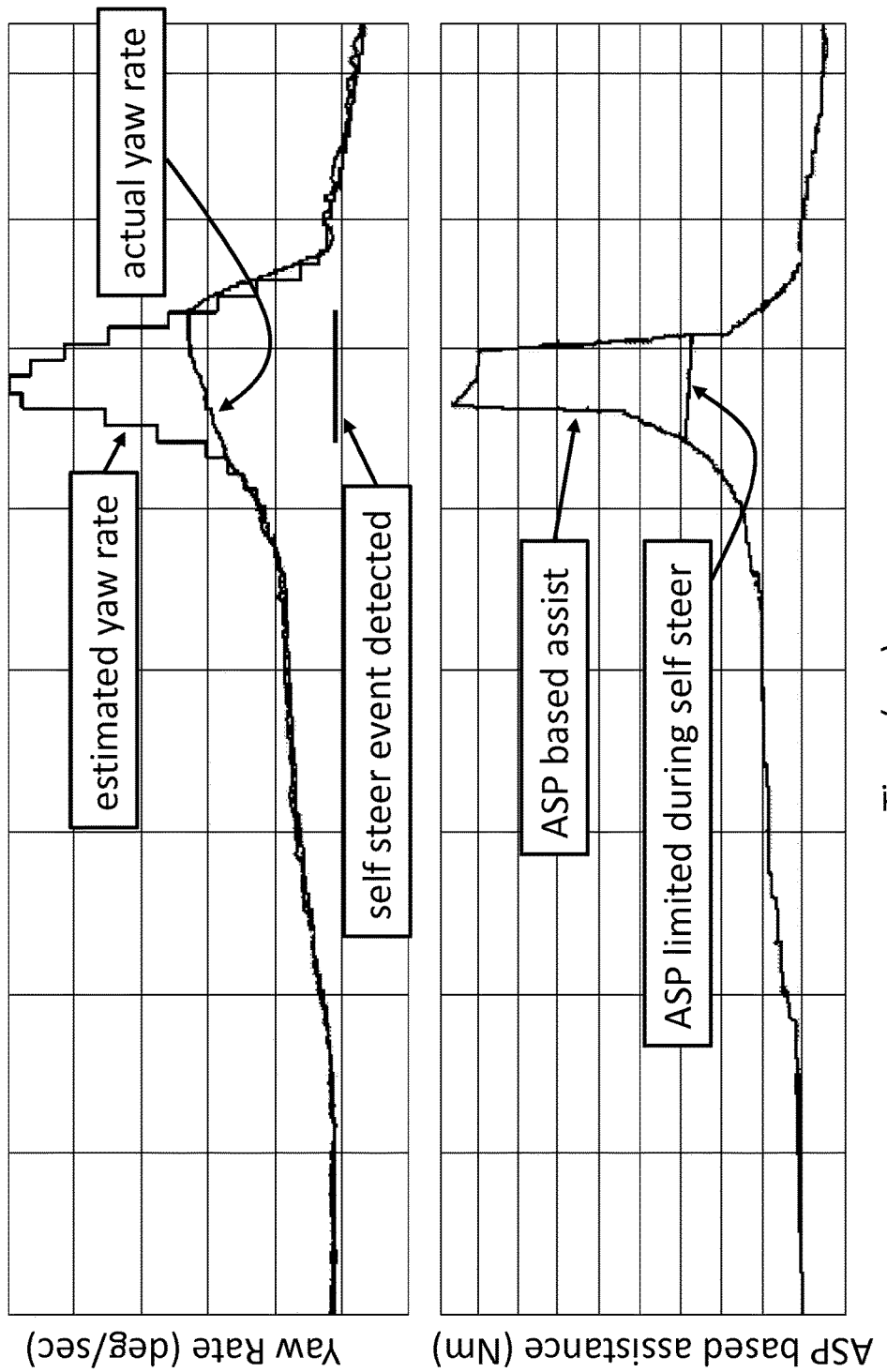
FIG. 5 is a comparative plot of assist torque and yaw rate vs. time.

As described above, the EPS assist limiter is configured to hold and or reduce power steering assist once the cornering forces on the front tires saturate. This concept can be used with various EPS assist strategies. As mentioned previously, the self steer condition typically occurs once the front tires reach saturation. This condition is shown, in conjunction with other steering conditions, in FIGS. 4 and 5. In a broad aspect of yet another embodiment, an EPS control strategy based on steering position, rather than measured steering torque, identifies the onset of this occurrence, in real time, and takes action to ameliorate self steer. The action is a decision of either holding the EPS assist at its pre-occurrence level or ramps the level of assist down from the onset detection point to a point where the tires re-enter the unsaturated region. Thus, by limiting any further assistance from the EPS the self steer condition can be prevented.

Figure 6:
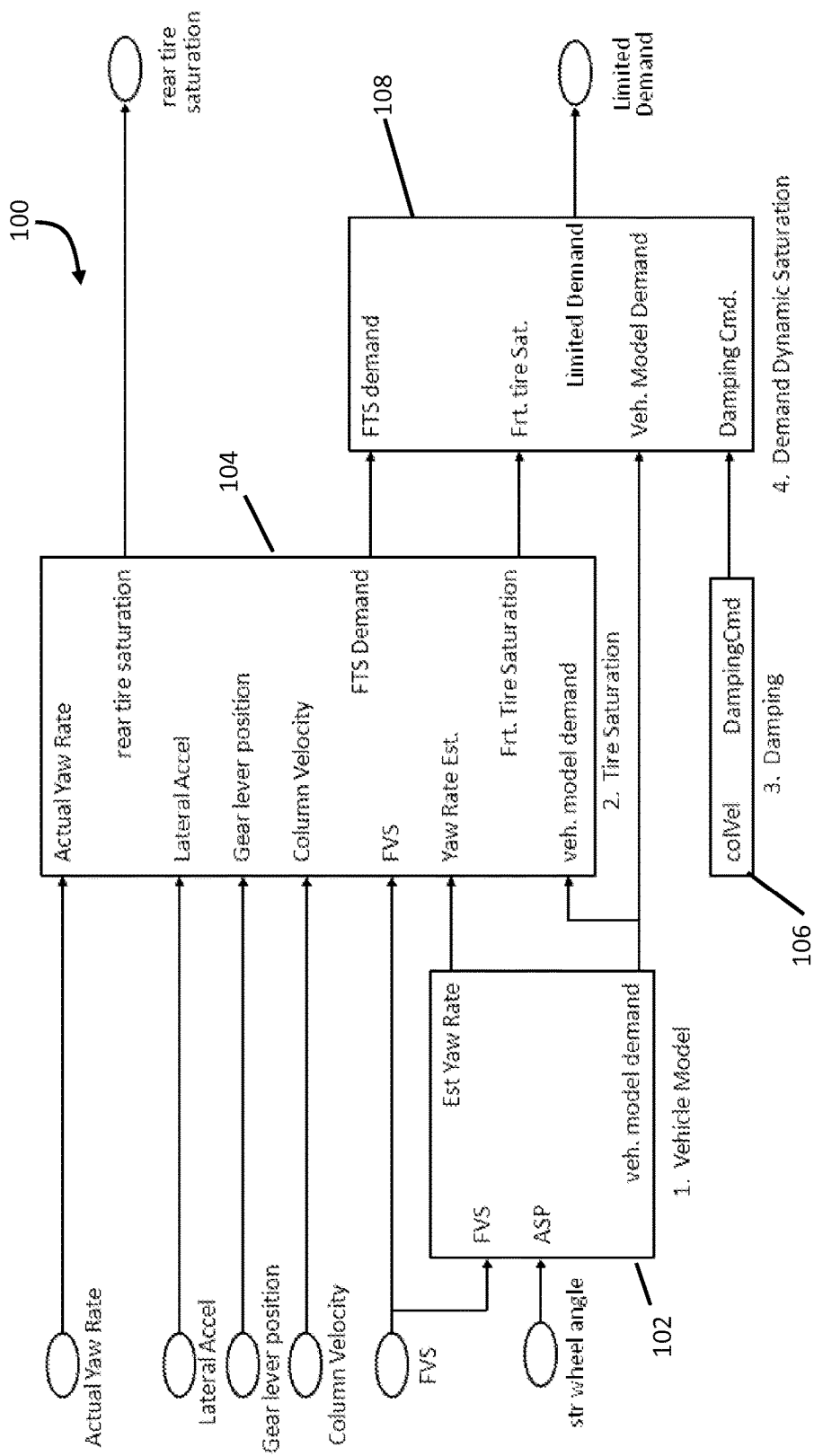
FIG. 6 is a block diagram of an embodiment of an ESP assist demand module.

As previously stated, over correction detection and control includes the detection of rear tire saturation. Certain instances arise when abrupt or sudden counter-maneuvers are executed. The potential exists for the system/driver to over correct in a counter steer condition, generally when the rear tires are saturated. In such an event, the natural reaction of the steering system is to align itself to the vehicle's direction of motion (not necessarily 0 deg ASP). System operation based on steering position control would calculate an assistance demand resulting in an over correcting of the counter steer, making the vehicle more difficult to control. As shown in FIG. 6, there is illustrated an embodiment of a demand determination module of an Angle-based Assist Control system for EPS operation, shown generally at 100. The demand module 100 includes four sub-functional blocks: a vehicle model 102, a tire saturation determiner 104, a damping input determiner 106, and an assist demand limit block 108.

The vehicle model 102 includes two parts. In the first part, the vehicle lateral acceleration is estimated using the estimated Yaw rate, as described above, and may use a steady-state bicycle model for determining the estimated yaw rate from vehicle speed and steering wheel angle inputs. In the second part, a force balance in the lateral frame of reference is used to estimate an aligning moment about a vehicle king pin axis and then reflected to column co-ordinates to provide an initial steering assistance demand.

The tire saturation determiner 104 detects when the front and/or rear tires are saturated and takes the appropriate action to accommodate demand generation in this nonlinear or saturated region. Since vehicular dynamic model estimates of certain parameter inputs, such as a bicycle model-based yaw rate and lat acc estimates, are generally applicable when the vehicle's front and rear tires are unsaturated, the steering initial assistance demand determination is affected as the tires approach saturation. The system detects front tire saturation when 1) the estimated yaw rate is greater than actual yaw rate by a calibration value, 2) both yaw rate values are of the same sign, and 3) the vehicle speed is greater than a calibration vehicle speed lower limit. When this condition is satisfied, the front tires are determined to be saturated. To determine rear tire saturation and configure the system to respond to an over correction in a counter steer condition, the saturation determiner module compares an absolute error between the estimated yaw rate and the actual yaw rate. If this error is greater than a threshold level, both yaw rates have opposite signs, and the vehicle speed is above a speed threshold level, rear tire saturation exists. The damping determiner module 106 calculates a torque demand to slow or damp the movement of the steering column. Finally, the assist demand limit block 108 provides a predetermined demand limit or demand limit range, based on the outcome of tire saturation.

Figure 7:
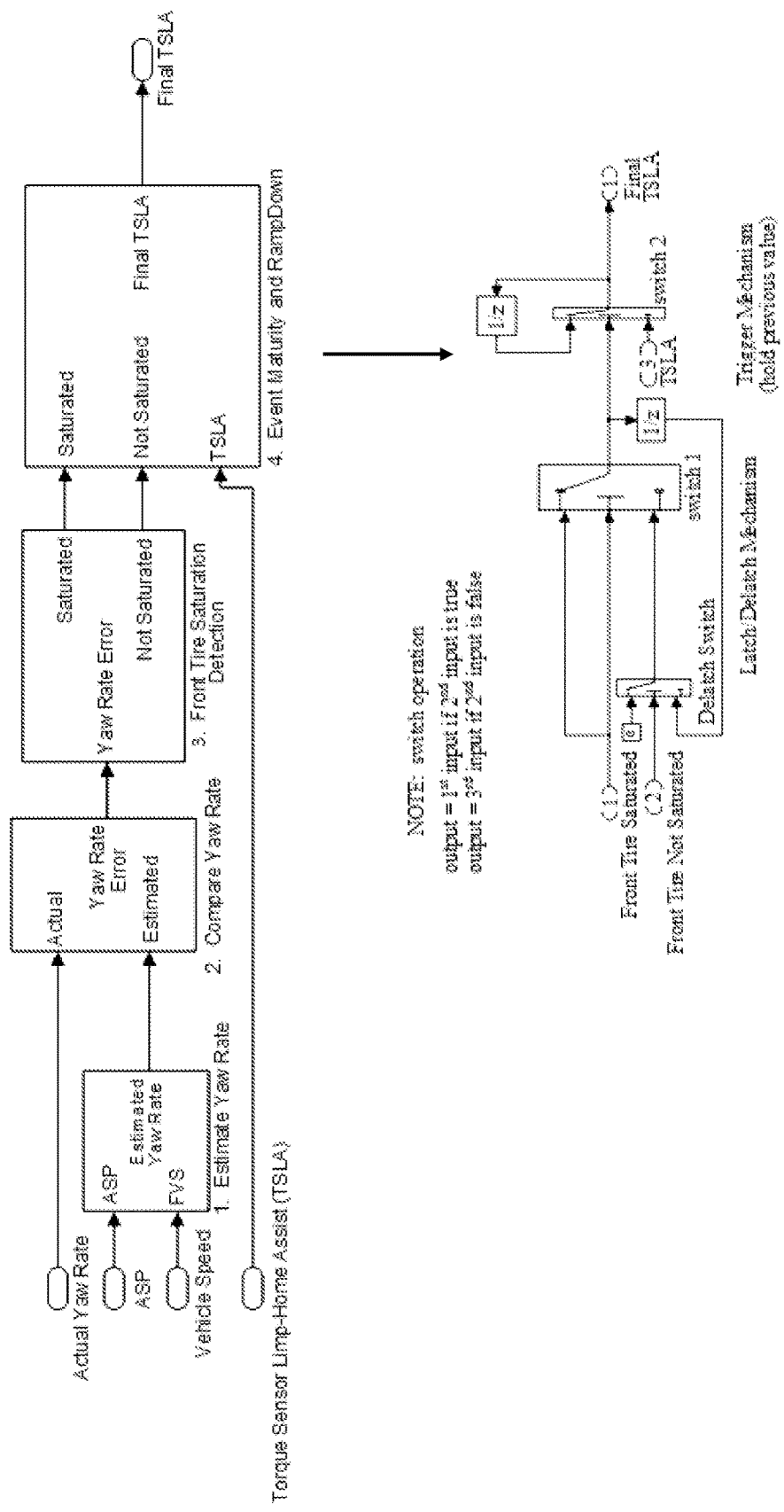
FIG. 7 is a block diagram of an embodiment of an ESP assist module.
Figure 8:
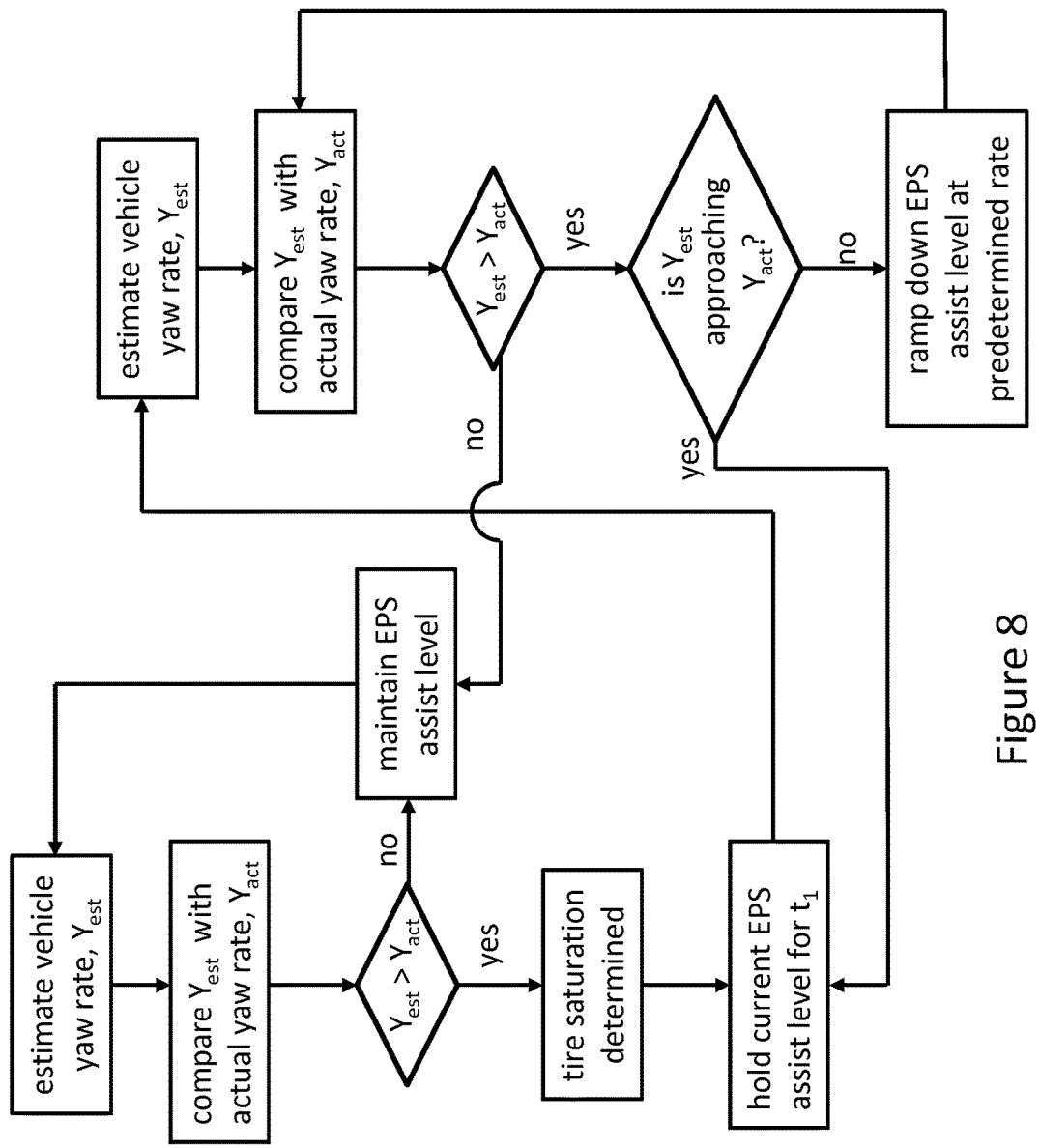
FIG. 8 is a flow chart of an embodiment of a method of ASP Steering Compensation.

Referring now to FIGS. 7 and 8, in one embodiment, an EPS assist strategy can be achieved with an algorithm, the sequence of operations of which are shown generally at 200. FIG. 7 illustrates the functional blocks as part of an ESP assist module showing the various sensor inputs and general data flow between sub-functional blocks. FIG. 8 is a flow diagram of steps taken by the algorithm to determine the final TSLA. In a first step, a yaw rate is estimated from ASP and vehicle speed inputs. This estimate applies to the un-saturated tire region. In a second step, the estimated yaw rate from step 1 is compared to an actual yaw rate value. In one embodiment, the actual yaw rate value may be received by sensors mounted on the vehicle. The sensors may be in direct communication with a module including the EPS assist limiter or may broadcast information over a CAN bus.

In a third step, a conclusion is derived from the step 2 comparison. In one particular aspect, a condition of front tire saturation will result in the Estimated Yaw Rate being greater than the Actual Yaw Rate and/or Lateral Acceleration/Vehicle Velocity. In another aspect, the values of estimated yaw rate [K*Actual yaw rate] and lateral acceleration/vehicle velocity [(1−K)Ay/u] are computed. In an optional feature of the invention, K may be a term that is dependent on vehicle speed or Ay. If the actual yaw rate exceeds the estimated yaw rate, the conclusion from step 3 is that no further limitation of the EPS assist is necessary. However, if the Estimated Yaw Rate is greater than the Actual Yaw Rate then the conclusion is that a front tire saturation occurrence is detected.

In a fourth step, a predetermined time is allowed to pass and steps 1-3 are conducted again. If the conclusion of front tire saturation persists for a defined time, then the assist demand is either a) held at the last level when the front tires were not saturated or b) ramped down at a predetermined rate to a specified percentage. The percentage reduction is a tunable parameter based on the measured lateral acceleration of the vehicle. Additionally, assist demand can be further reduced for any additional steering motion in the direction of tire saturation based on the steering or motor velocity. In a fifth step, the assist ramp-down or limiting shall continue until either of the following two conditions or a combination of the two conditions occur, a) the Estimated Yaw Rate is less than the Actual Yaw Rate b) Unreduced Assist Demand based on the vehicle model is less than the held or reduced assist demand. Assist can then be set to its unreduced value calculated based on the vehicle model.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electric power steering system including:
  a first steering assist mode wherein a control for providing a calculated torque assist demand is responsive to a steering wheel torque sensor;
  a second steering assist mode wherein the control for providing the calculated torque assist demand, in the event of failure of the steering wheel torque sensor, is responsive to one or more sensors related to vehicle speed, a steering column position, a steering column velocity, a gear lever position, a vehicle yaw rate or a vehicle lateral acceleration, for generating the calculated torque assist demand; and
  modifying the level of torque assist demand during the second steering assist mode when an estimated yaw rate is greater than an actual yaw rate.

2. The electric power steering system according to claim 1 wherein the control is operable to further modify the torque assist demand by providing one or more of (a) friction and inertial compensation, (b) vehicle oversteer compensation, (c) reverse motion compensation, (d) damping compensation and (e) self-steer prevention.

3. The electric power steering system of claim 1, wherein the estimated vehicle yaw rate is determined from the vehicle speed and steering wheel angle inputs.

4. An electric power steering system including:
  a first steering assist mode wherein a control for providing a calculated torque assist demand is responsive to a steering wheel torque sensor;
  a second steering assist mode wherein the control for providing the calculated torque assist demand, in the event of failure of the steering wheel torque sensor, is responsive to one or more sensors related to vehicle speed, a steering column position, a steering column velocity, a gear lever position, a vehicle yaw rate or a vehicle lateral acceleration, for generating the calculated torque assist demand; and
  reducing the level of torque assist demand during the second steering assist mode as a function of comparing an estimated yaw rate and an actual yaw rate.

5. The electric power steering apparatus according to claim 4 wherein the control is operable to also modify the torque assist demand by providing one or more of (a) friction and inertial compensation, (b) vehicle oversteer compensation, (c) reverse motion compensation, (d) damping compensation and (e) self steer prevention.

6. An electric power steering system to provide a torque assist demand, the electric power steering system including:
  a first steering assist mode wherein a control for providing a calculated torque assist demand is responsive to a steering wheel torque sensor;
  a second steering assist mode wherein the control for providing the calculated torque assist demand, in the event of failure of the steering wheel torque sensor, is calculated according to the following steps:
    a first step calculating a vehicle yaw rate from a steering column position and a vehicle speed, the vehicle yaw rate corresponding to an unsaturated condition;
    a second step comparing the calculated vehicle yaw rate to an actual vehicle yaw rate, the actual vehicle yaw rate identified by a sensor mounted on the vehicle;
    a third step determining whether saturation exists from the comparison of the calculated vehicle yaw rate and the actual vehicle yaw rate, wherein saturation exists if the calculated vehicle yaw rate exceeds the actual vehicle yaw rate;
    a fourth step comprising repeating the first step, the second step, and the third step, wherein upon identifying saturation in the fourth step, a torque limp home assist demand is modified by a function; and
    a fifth step applying the function to the torque limp home assist demand until one of the calculated vehicle yaw rate is less than the actual vehicle yaw rate and the torque limp home assist demand is less than one of a ramp-down reduced torque limp home assist demand and a held torque limp home assist demand, at which point the function is unapplied from the torque limp home assist demand.

7. The electric power steering system from claim 6, wherein the fourth step is executed upon identifying saturation in the third step.

8. The electric power steering system from claim 6, wherein the function is one of a hold function and a ramp-down function, the hold function holds the torque limp home assist demand at the last level prior to saturation, the ramp-down function lowers the torque limp home assist demand by a predetermined rate to a specified percentage.

9. The electric power steering system from claim 8, wherein the predetermined rate and the specified percentage are tunable parameters based on a measured lateral acceleration of the vehicle.

10. The electric power steering system from claim 6, wherein the fifth step further includes the torque limp home assist demand being further reduced for any additional steering motion in the direction of tire saturation based on at least one of a steering column velocity and motor velocity.

* * * * *